US007606842B2

(12) United States Patent
Quakenbush

(10) Patent No.: US 7,606,842 B2
(45) Date of Patent: Oct. 20, 2009

(54) METHOD OF MERGING A CLONE FILE SYSTEM WITH AN ORIGINAL FILE SYSTEM

(75) Inventor: Gary Lee Quakenbush, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 289 days.

(21) Appl. No.: 11/535,713

(22) Filed: Sep. 27, 2006

(65) Prior Publication Data

US 2008/0077634 A1    Mar. 27, 2008

(51) Int. Cl.
    *G06F 17/00* (2006.01)
(52) U.S. Cl. .................................. 707/203; 707/204
(58) Field of Classification Search ................ 707/200, 707/204; 711/161
    See application file for complete search history.

(56) References Cited

U.S. PATENT DOCUMENTS

| | | | |
|---|---|---|---|
| 5,761,678 A * | 6/1998 | Bendert et al. ............... | 707/204 |
| 6,704,745 B2 | 3/2004 | Della-Libera et al. | |
| 7,007,047 B2 | 2/2006 | Zelenka et al. | |
| 7,073,053 B1 * | 7/2006 | Oz et al. ......................... | 713/2 |
| 7,103,876 B1 | 9/2006 | Lopez et al. | |
| 7,334,095 B1 * | 2/2008 | Fair et al. .................... | 711/161 |
| 2002/0169998 A1 * | 11/2002 | Largman et al. ............... | 714/25 |
| 2005/0099963 A1 * | 5/2005 | Multer et al. ................ | 370/254 |
| 2005/0138623 A1 | 6/2005 | Fresko | |
| 2005/0216527 A1 | 9/2005 | Erlingsson | |
| 2005/0240621 A1 * | 10/2005 | Robertson et al. ........... | 707/102 |
| 2005/0283348 A1 | 12/2005 | Tsui et al. | |
| 2005/0289533 A1 * | 12/2005 | Wang et al. .................. | 717/168 |
| 2006/0174238 A1 * | 8/2006 | Henseler et al. ............. | 717/168 |
| 2008/0126792 A1 * | 5/2008 | Herington et al. ........... | 713/100 |

OTHER PUBLICATIONS

Hybinette et al "Cloning Parallel Simulations", ACM Transactions on Modeling and Computer Simulation, vol. 11, No. 4, Oct. 2001, pp. 378-407.*
Wikipedia, Checksum, http://en.wikipedia.org/wiki/Checksum, 2 pages printed Sep. 12, 2006.
Wikipedia, Cyclic Redundancy Check, http://en.wikipedia.org/wiki/Cyclic_redundancy_check, 10 pages printed Sep. 12, 2006.
Wikipedia, Hash Function, http://en.wikipedia.org/wiki/Hash_function, 4 pages printed Sep. 15, 2006.
Infotrieve ELN, Benefits Across the Organization, http://www.gensys.com/products/features_benefits/benefits.html, 4 pages printed Sep. 6, 2006.
Wikipedia, MD5, http://en.wikipedia.org/wiki/Md5, 5 pages printed Sep. 12, 2006.
MD5 Homepage (Unofficial), http://userpages.umbc.edu/~mabzug1/cs/md5/md5.html, 3 pages printed Sep. 26, 2006.
Wikipedia, Microsoft Windows, http://en.wikipedia.org/wiki/Microsoft_Windows, 9 pages printed Sep. 12, 2006.
Rogers et al., "z/OS Distributed File Service zSeries File System z/OS V1R7 Implementation", Redbooks, www.ibm.com/redbooks, see pp. 21 and 133, Feb. 2006.
Wikipedia, Patch (Computing), http://en.wikipedia.org/wiki/Patch_%28computing%29, 3 pages printed Sep. 9, 2006.

(Continued)

*Primary Examiner*—Uyen T. Le

(57) ABSTRACT

Metadata about an original file system is saved at the time of creation of a clone file system of the original file system. The metadata is used at a later time to detect changes to the original file system. These changes are then applied to the clone file system which has its own changes different from the changes of the original file system. Changes made to the clone file system are merged into the original file system after at least one boot of a computer system from the clone file system.

12 Claims, 5 Drawing Sheets

OTHER PUBLICATIONS

Wikipedia, POSIX, http://en.wikipedia.org/wiki/POSIX, 3 pages printed Sep. 12, 2006.
David Nanian, SuperDuper! User's Guide, 60 pages Copyright 2003-2006.
Solaris 10 Installation Guide: Solaris Live Upgrade and Upgrade Planning, Synchronizing Files Between Boot Environments, http://docs.sun.com/app/docs/doc/817-5505/6mkv5m1ks?a=view, 3 pages printed Aug. 29, 2006.
Ghemawat et al., The Google File System, SOSP'03, 15 pages ACM 2003.
Wikipedia, Unix, http://en.wikipedia.org/wiki/Unix, 12 pages printed Sep. 12, 2006.

* cited by examiner

METHOD OF MERGING A CLONE FILE SYSTEM WITH AN ORIGINAL FILE SYSTEM

BACKGROUND

When a technical support person wishes to apply software maintenance and/or data update to a computer file system, the person may clone the original file system. This may allow activity to continue on the computer system while the technical support person performs testing on and/or applies updates to the clone file system.

DESCRIPTION OF THE DRAWINGS

Features of exemplary implementations of the invention will become apparent from the description, the claims, and the accompanying drawings in which:

DETAILED DESCRIPTION

Figure 1:
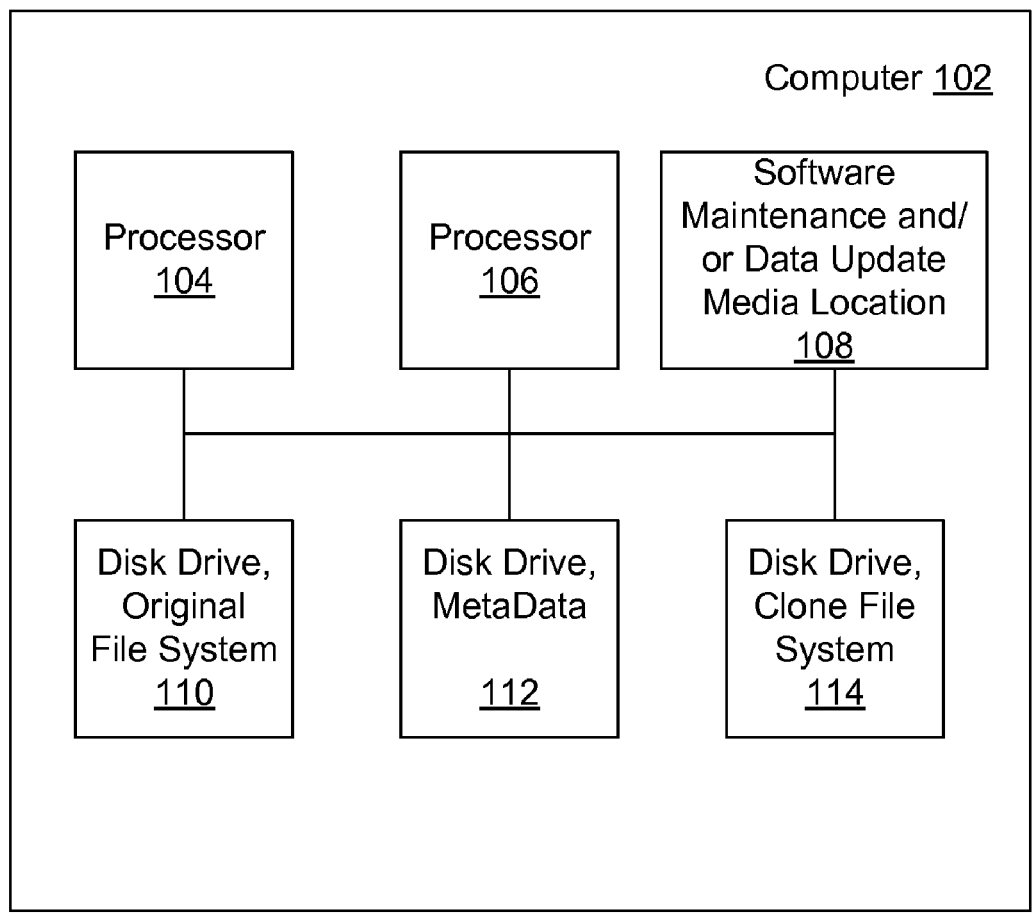
FIG. 1 is a representation of an implementation of an apparatus according to a preferred embodiment of the invention that comprises one or more computers that comprise one or more processors and a plurality of memory locations and/or disk drives, for example, one or more of a software maintenance and/or data update media location, an original file system disk drive, a metadata disk drive, and/or a clone file system disk drive.

Referring to the BACKGROUND section above, when the technical support person has completed the testing and/or updating of the clone file system, it may be desirable to reboot the computer system from the clone file system to complete the maintenance. It may be noted that data may have changed on the contemporaneously running original file system during the time from the creation of the clone until the desire to reboot from the clone, including the time for testing and/or updating of the clone. It may be desirable to apply the changed data from the running system to the clone before the reboot, so the data will not be lost.

When a file system is cloned, and then changes such as software maintenance and/or data update are applied to the clone, it may be desirable to detect what has changed on the original file system after the clone was created, and apply those changes to the clone. Comparing the original file system to the clone is not adequate for detection, since that identifies items changed on the clone in addition to items changed on the original. It may be desirable to identify only what has changed on the original after the clone was created, and apply those changes to the clone. An exemplary approach saves information on each file when the clone is created, and then later uses the saved file information to identify which files from the original file system have changed and apply those changes to the clone.

An exemplary implementation detects files that have been changed, added, and/or deleted on a file system after a creation of a clone of that file system, while the clone has changes such as software maintenance and/or data update applied to the clone. It may be desirable to apply those changes to the clone to perform a reboot off the clone without loss of data. An exemplary consideration is what to do with files that changed or were added on both the clone and the original file system.

It may be unsatisfactory to attempt to limit data coordination and/or data synchronization to files owned by users of the file system, excluding changes to the operating system (OS) and application files that are normally not modified by the user. That attempt may compare the original file system and the clone file system to generate an initial list of changed files, and remove from that list files known to be part of the operating system and application packages that may have been modified on the clone when software maintenance and/or data update were applied to the clone. One or more exemplary shortcomings of the attempt may comprise an unsatisfactory exclusion of configuration files for the operating system or applications that were modified by the user on the original after the clone, an inability to handle operating system or application changes applied to the original after the clone, and/or an inability to work around inaccuracies in the database listing files that may be part of the operating system and applications.

Also, it may be unsatisfactory to attempt to generate a list of differences between the original and clone, and have the user choose which files in that list to copy to the clone. One or more exemplary shortcomings of the attempt may comprise relatively large amounts of time required and/or inaccuracy from the user not always knowing whether a change to a file was on the original, the clone, or both.

Further, it may be unsatisfactory to attempt to coordinate and/or synchronize data from only a small set of specific files and directories from the original to the clone file system. An exemplary shortcoming of the attempt may comprise an inability to coordinate and/or synchronize data from other files and/or directories that have been modified, so those modifications would be lost in the clone.

An exemplary implementation performs one or more software maintenance tasks on a computer system through employment of a clone approach. An exemplary clone approach may serve to reduce and/or minimize downtime of the computer system during one or more software maintenance and/or data update tasks. An exemplary clone approach may serve to quickly undo one or more software maintenance and/or data update tasks and return to an original file system without application of the one or more software maintenance and/or data update tasks.

An exemplary implementation saves separate information about the original file system at the time the clone is created, for later employment to update the clone before reboot of the computer system from the clone. An exemplary implementation saves separate information about the original file system at the time the clone is created, for full data coordination and/or data synchronization just before the clone is booted up. An exemplary full data coordination and/or data synchronization applies to all files on both the original file system and on the clone. An exemplary full data coordination and/or data synchronization applies to files modified on both the original file system and on the clone.

An exemplary implementation differentiates between changes on an original file system and changes such as software maintenance and/or data update that have been applied to a clone file system, automatically applies most changes from the original file system to the clone file system, and optionally automates merges for editable/mergeable files that have changed on both the original and the clone.

Turning to FIG. 1, an implementation of an apparatus 100 in an example comprises one or more computers, computer systems, and/or computing devices. An exemplary implementation comprises a single computer 102 that comprises one or more processors 104 and/or 106 and a plurality of memory locations and/or disk drives, for example, one or more of software maintenance and/or data update media location 108, original file system disk drive 110, metadata disk drive 112, and/or clone file system disk drive 114. The software maintenance and/or data update media location 108, the original file system disk drive 110, the metadata disk drive 112, and the clone file system disk drive 114 in an example comprise storage, for example, on respective memory disks and/or other storage areas such as partitions on a single disk, partitions on a single volume group that may employ multiple underlying physical disks, partitions on a shared storage area that supplies partitions to multiple computers, and/or a mixture of these. The original file system disk drive 110 and the clone file system disk drive 114 in an example comprise respective bootable disks and/or bootable storage areas. For example, the original file system disk drive 110 comprises one bootable disk and/or bootable storage area, and the clone file system disk drive 114 comprises another bootable disk and/or bootable storage area, as will be appreciated by those skilled in the art.

The computer 102 in an example comprises a single processor 104 or 106. In another example, the computer 102 comprises multiple processors, for example processors 104 and 106. An exemplary implementation with multiple processors performs tasks in parallel to increase performance.

The software maintenance and/or data update media location 108 in an example comprises one or more of a DVD/CD drive, media or files on a network drive, a web page download to memory, and/or a physical location supportable by an operating system, for example, as a system program 210 (FIG. 2) of the computer 102. The software maintenance and/or data update media location 108 in an example comprises one or more of patch, update, and/or service pack media employable for software maintenance and/or data update on the computer 102.

Figure 2:
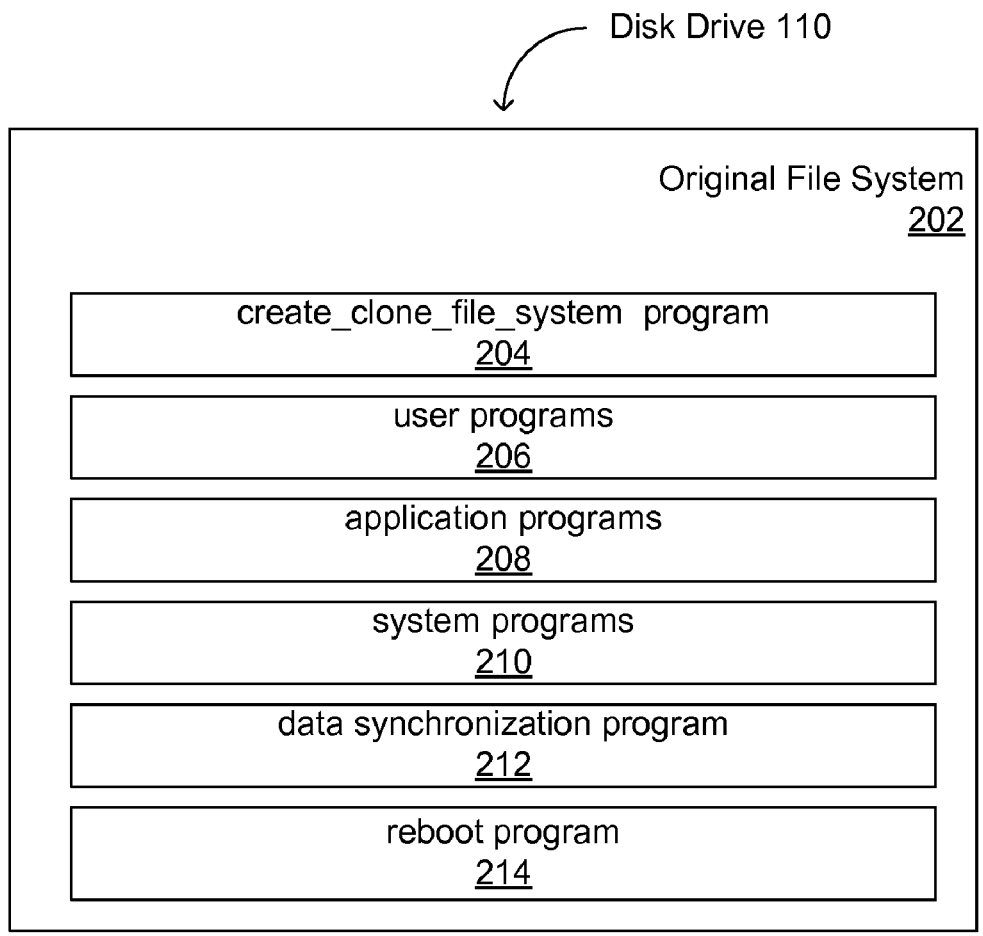
FIG. 2 is a representation of the original file system disk drive of an implementation of the apparatus of FIG. 1 and illustrates exemplary supplementary contents and normal, typical, standard, and/or usual contents of a booted file system.

Referring to FIGS. 1 and 2, the original file system disk drive 110 in an example comprises supplementary contents and normal, typical, standard, and/or usual contents of a booted file system. An exemplary original file system disk drive 110 comprises an original file system 202, one or more clone creation tools and/or create_clone_file_system programs 204, one or more user programs 206, one or more application programs 208, one or more system programs 210, one or more data coordination and/or data synchronize tools and/or programs 212, and one or more reboot tools and/or programs 214. In an example, the clone creation tools and/or create_clone_file_system programs 204 and/or the data coordination and/or data synchronize tools and/or programs 212 may comprise user-level programs that are distinct program files in their respective file systems. In another example, the clone creation tools and/or create_clone_file_system programs 204 and/or the data coordination and/or data synchronize tools and/or programs 212 may be implemented as kernel-resident and/or operating-system-resident logic, for example, that does not reside in distinct user-level program files. In a further example, the clone creation tools and/or create_clone_file_system programs 204 and/or the data coordination and/or data synchronize tools and/or programs 212 may comprise a combination of user-level programs and/or kernel-resident and/or operating-system-resident logic, for example, user interface logic residing in user-level program files with additional and/or remaining logic residing in the kernel and/or underlying operating system.

The original file system 202 in an example is actively used by the computer 102 at a beginning of an exemplary overall task. The overall task in an example comprises performance of one or more software maintenance tasks on the computer system 102 through employment of a clone approach.

An exemplary create_clone_file_system program 204 creates a copy of the original file system 202 on a single and/or separate bootable disk, for example, the original file system disk drive 110, the metadata disk drive 112, or clone file system disk drive 114. In another example, the create_clone_file_system program 204 creates the copy of the original file system 202 on one or more bootable disks, for example, the metadata disk drive 112 and/or clone file system disk drive 114. That separate copy of the file system in an example comprises a clone of the original file system 202, for example, a clone file system 402 (FIG. 4).

Figure 3:
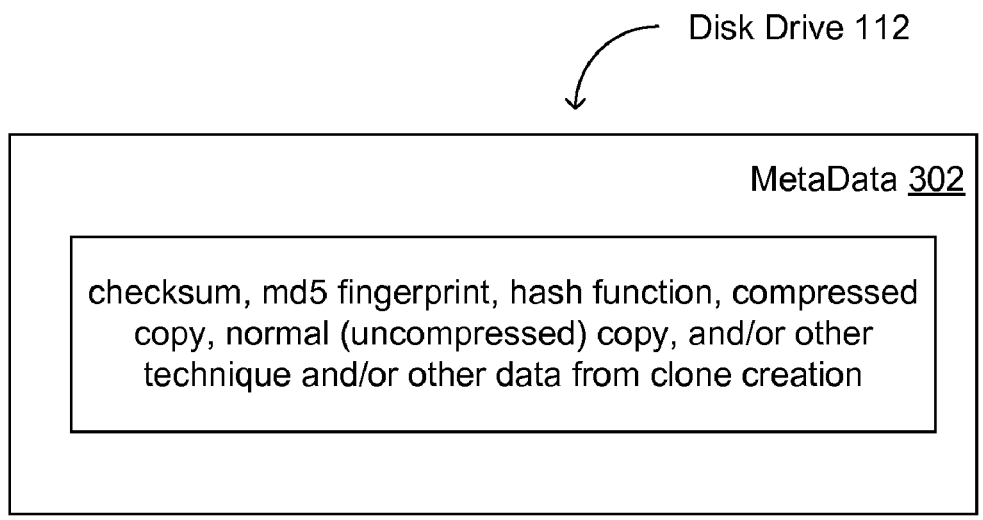
FIG. 3 is a representation of the metadata disk drive of an implementation of the apparatus of FIG. 1 and illustrates exemplary metadata of an original file system, for example, to be employed later to update a clone file system.
Figure 4:
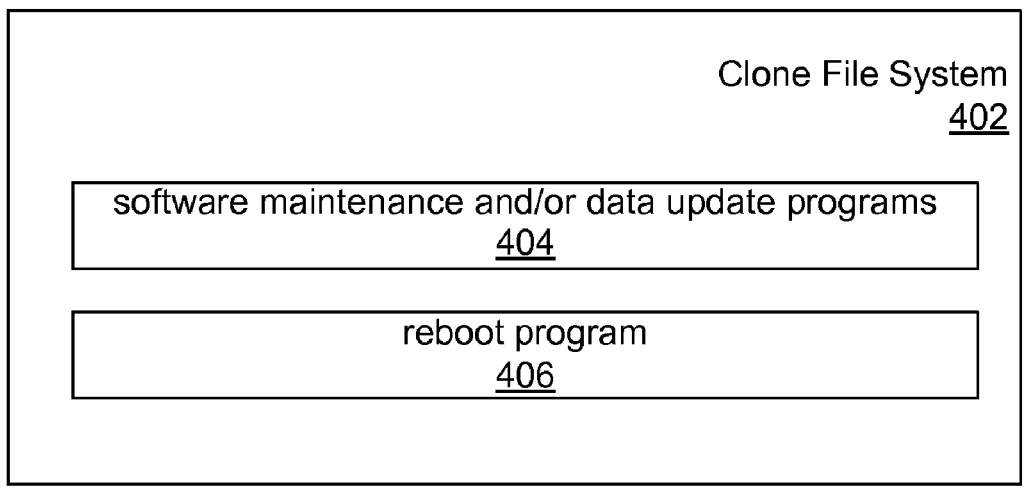
FIG. 4 is a representation of the clone file system disk drive of an implementation of the apparatus of FIG. 1 and illustrates exemplary software maintenance and/or data update programs and an exemplary reboot program.

Referring to FIGS. 2 and 3, the create_clone_file_system program 204 in an example generates metadata 302 of the original file system 202, for example, to be employed later to update the clone file system 402 (FIG. 4). The create_clone_file_system program 204 in an example saves the metadata 302 on the original file system disk drive 110, the metadata disk drive 112, and/or clone file system disk drive 114. For example, the metadata disk drive 112 may be optional. The metadata 302 in an example comprises information about and/or documentation of other data managed within one or more applications and/or environments. The metadata 302 in an example comprises data about data elements or attributes (e.g., name, size, data type, etc.), data about records and/or data structures (e.g., length, fields, columns, etc.), and/or data about data (e.g., where it is located, how it is associated, ownership, etc.). The metadata 302 in an example comprises descriptive information about the context, quality and condition, or characteristics of the data. The metadata 302 in an example comprises file object attributes, directory object contents, and/or descriptions and/or information about relationships.

The metadata 302 in an example comprises a checksum, MD5 fingerprint, hash function, compressed copy, normal (uncompressed) copy, and/or other technique and/or other data for each file in the original file system 202, to be employed later for update, data coordination, and/or data synchronization of the clone file system 402 before reboot of the computer 102 from the clone file system 402. The create_clone_file_system program 204 in an example saves the checksum and all and/or substantially all other attributes of each file from the original file system 202, for the clone file system 402. As an exemplary create_clone_file_system program 204 copies the files from the original file system 202 to the clone file system 402, the create_clone_file_system program 204 generates a checksum of each file. For each file copied, the create_clone_file_system program 204 in an example saves the file path, type, link-path, link-count, size, last-modify-time, checksum, and any other attributes of each file in a database or control file residing in the metadata 302. The set of attributes for a file may vary depending on the type of system, for example, the link-path and link-count attributes may apply to systems under the trade identifier UNIX but may not apply to systems offered under the trade identifier MICROSOFT WINDOWS.

An exemplary create_clone_file_system program 204 saves attributes of each file from the original file system 202 copied during the clone and saves a copy of potentially editable or mergeable files such as ASCII or *txt files. The create_clone_file_system program 204 in an example saves a complete and/or substantially complete copy of any, all, and/or substantially all mergeable files, for example, saving them in a same area in which the checksums and other attributes are saved. The copy of mergeable files in the metadata 302 in an example would be in addition to the copy of those files in the clone file system 402. The copy of mergeable files in the metadata 302 in an example serves to facilitate automated merge during synchronization for mergeable files that are modified on both the original file system 202 and the clone file system 402 after the clone file system 402 is created. When potentially editable or mergeable files are copied to the clone file system 402, the create_clone_file_system program 204 in an example saves an extra copy of the file in the metadata 302. Files that are not potentially editable or mergeable, such as compiled programs, in an example need not have an extra copy saved in the metadata 302. Full details of which files are editable/mergeable may vary for different system types. The link-path attribute in an example is needed only for soft links and hard links, and may be set to "" (empty string) for other types of files.

The create_clone_file_system program 204 in an example generates and saves the checksums, attributes, and extra file copies immediately after all files are copied to the clone file system 402. To reduce disk i/o (input/output) and/or increase speed, an exemplary create_clone_file_system program 204 may comprise a custom copy tool that initializes a checksum algorithm before the first buffer of data for a file, incrementally applies the checksum algorithm to each buffer of data that is transferred, and applies any final aspects of the algorithm after the last buffer of a file. A CRC (Cyclic Redundancy Check) checksum such as employed by the POSIX cksum command in an exemplary implementation may be sufficient, and another exemplary implementation may employ MD5 and/or another more secure algorithm, for example, to protect from spoofing. For additional performance on multiple processor systems, an exemplary create_clone_file_system program 204 may employ a pipe to route data through a separate checksum process that may run on a separate processor, for example, the processor 104 or 106.

Referring to FIG. 2, the user programs 206, the one or more application programs 208, and/or the one or more system programs 210 in an example serve to modify, add, and/or remove files on the original file system 202, for example, as part of a normal operation and/or functioning of the computer 102 and applications that run on the computer 102. For example, these things are happening on the original file system 202 contemporaneously, concurrently, simultaneously, and/or in a same general timeframe that one or more software maintenance and/or data update programs 404 (FIG. 4) are working on the clone file system 402.

Referring to FIGS. 2 through 4, an exemplary data coordination and/or data synchronization program 212 looks for changes that have occurred on the original file system 202 since the time of creation of the clone file system 402 and the metadata 302. The data coordination and/or data synchronization program 212 in an example coordinates and/or synchronizes the clone file system 402 by looking at files on the original file system 202, files on the clone file system 402, and the metadata 302, for example, the saved checksum and other attributes and mergeable files. The data coordination and/or data synchronization program 212 in an example detects changes that happened on the original file system 202 after the clone file system 402 was created, and applies those changes to the clone file system 402. The data coordination and/or data synchronization program 212 in an example employs the metadata 302 to determine what has changed on the original file system 202, copies files that have changed on the original file system 202 but have not changed on the clone file system 402, and allows a user to merge or discard changes to files in the original file system 202 that have also changed on the clone file system 402.

In an exemplary implementation, after the user has applied changes to the clone file system 402 such as software maintenance and/or data updates, the user may request data coordination and/or data synchronization. When requested, the data coordination and/or data synchronization program 212 in an example processes the saved list of files of the metadata 302 created during creation of the clone file system 402, and then traverses the original file system 202 to detect and process any added, modified, and/or removed files. For each file in the metadata 302, the data coordination and/or data synchronization program 212 in an example compares saved size to size of the file on the original file system 202. If size is the same, the data coordination and/or data synchronization program 212 in an example generates the checksum of the file on the original file system 202 to detect a change in contents that did not affect the size. Also, the data coordination and/or data synchronization program 212 in an example compares other saved attributes to attributes of the file on the original file system 202. If size or checksum varies, that serves to indicate a contents change in the file. If size and checksum do not vary but one or more other attributes vary, that serves to indicate an attribute-only change.

For each file that has a contents or attribute-only change on the original file system 202, the data coordination and/or data synchronization program 212 performs a similar check of saved information of the metadata 302 against the clone file system 402. If the clone file system 402 shows no change, go ahead and apply the changes from the original file system 202 to the clone file system 402. Applying changes in an example comprises copying contents if size or checksum changes, otherwise only update attributes on the clone file system 402. The data coordination and/or data synchronization program 212 in an example logs the action taken in a logfile that resides in the location of the clone file system 402 that is reserved for clone related overhead.

If the data coordination and/or data synchronization program 212 detects changes to a file in both the original file system 202 and in the clone file system 402, the data coordination and/or data synchronization program 212 in an example checks if the file is the same in both the original file system 202 and the clone file system 402. If the same, the data coordination and/or data synchronization program 212 in an example takes no action except to log the finding in the logfile that resides in the location of the clone file system 402 that is reserved for clone related overhead.

Instead, if the data coordination and/or data synchronization program 212 detects different changes in a file on the original file system 202 and the clone file system 402, and the file is editable or mergeable so an extra copy was saved during the clone operation, then the data coordination and/or data synchronization program 212 in an example performs an edit and/or merge operation to apply changes done on the original file system 202 to the copy of the file on the clone file system 402. This may be an automatic merge operation or a manual edit and/or merge operation. An exemplary implementation logs all needed merge operations and later steps through them with the user approving each change. If a file had different changes on the original file system 202 and the clone file system 402 but the file is a type that is not editable or mergeable, the data coordination and/or data synchronization program 212 in an example logs that information and ensures the user is aware of the information, for example, so appropriate action can be taken. The user may have special knowledge related to that file, so may be able to take an appropriate action.

After processing the list of files in the metadata 302 saved during the creation of the clone file system 402, the data coordination and/or data synchronization program 212 in an example processes files added and deleted on the original file system 202. The data coordination and/or data synchronization program 212 in an example traverses the original file system 202 and compares the list of directories and files found to the list of directories and files saved in the metadata 302 when the clone file system 402 was created. All detected additions and deletions in an example are logged by the data coordination and/or data synchronization program 212, together with any action taken. When a deletion is found on the original file system 202, the data coordination and/or data synchronization program 212 in an example applies the deletion to the clone file system 402. When an addition is found on the original file system 202, the data coordination and/or data synchronization program 212 in an example checks the clone file system 402 to see if the same file has been added on the clone file system 402. If the same file has not been added to the clone file system 402, the data coordination and/or data synchronization program 212 in an example applies the addition to the clone file system 402. If the same file name has been added to the clone file system 402, the data coordination and/or data synchronization program 212 in an example compares the added file on the original file system 202 and the clone file system. If the added files are identical, the data coordination and/or data synchronization program 212 in an example takes no action. If there is any difference in contents or attributes between the two added files, the data coordination and/or data synchronization program 212 in an example logs that information, for example, in a way that the user is made aware a manual resolution is needed.

Exemplary reboot programs 214 and 406 are each capable of rebooting the computer 102 from any bootable disk on the computer 102. In an exemplary implementation, any file system containing an operating system contains a reboot program that works correctly when the operating system in that file system is running. The reboot command on the original file system 202 in an example is employed to boot the computer system 102 from the clone file system 402. In an exemplary implementation, a reboot program residing in an operating system that is not currently active is not used, for example, since a reboot command from that reboot program may not be compatible with the currently active operating system. The reboot of the computer 102 from the clone file system 402 in an example comprises the only and/or substantially the only time when there is downtime for the computer 102 between the time of creation of the clone file system 402, through the software maintenance and/or data update of the clone file system 402, and through the data coordination and/or data synchronization for the clone file system 402 for changes that occurred from activity on the original file system 202 while the clone file system 402 underwent the software maintenance and/or data update.

Referring to FIG. 4, an exemplary software maintenance and/or data update program 404 serves to apply and/or install one or more patches and/or updates to the clone file system 402 and/or perform other software maintenance and/or data update on the clone file system 402. As noted in additional exemplary discussion herein, the one or more software maintenance and/or data update programs 404 work on the clone file system 402 contemporaneously, concurrently, simultaneously, and/or in a same general timeframe that the user programs 206, the one or more application programs 208, and/or the one or more system programs 210 may modify, add, and/or remove files on the original file system 202, for example, as part of a normal operation and/or functioning of the computer 102 and applications that run on the computer 102, while the clone file system 402 undergoes software maintenance and/or data update.

Figure 5:
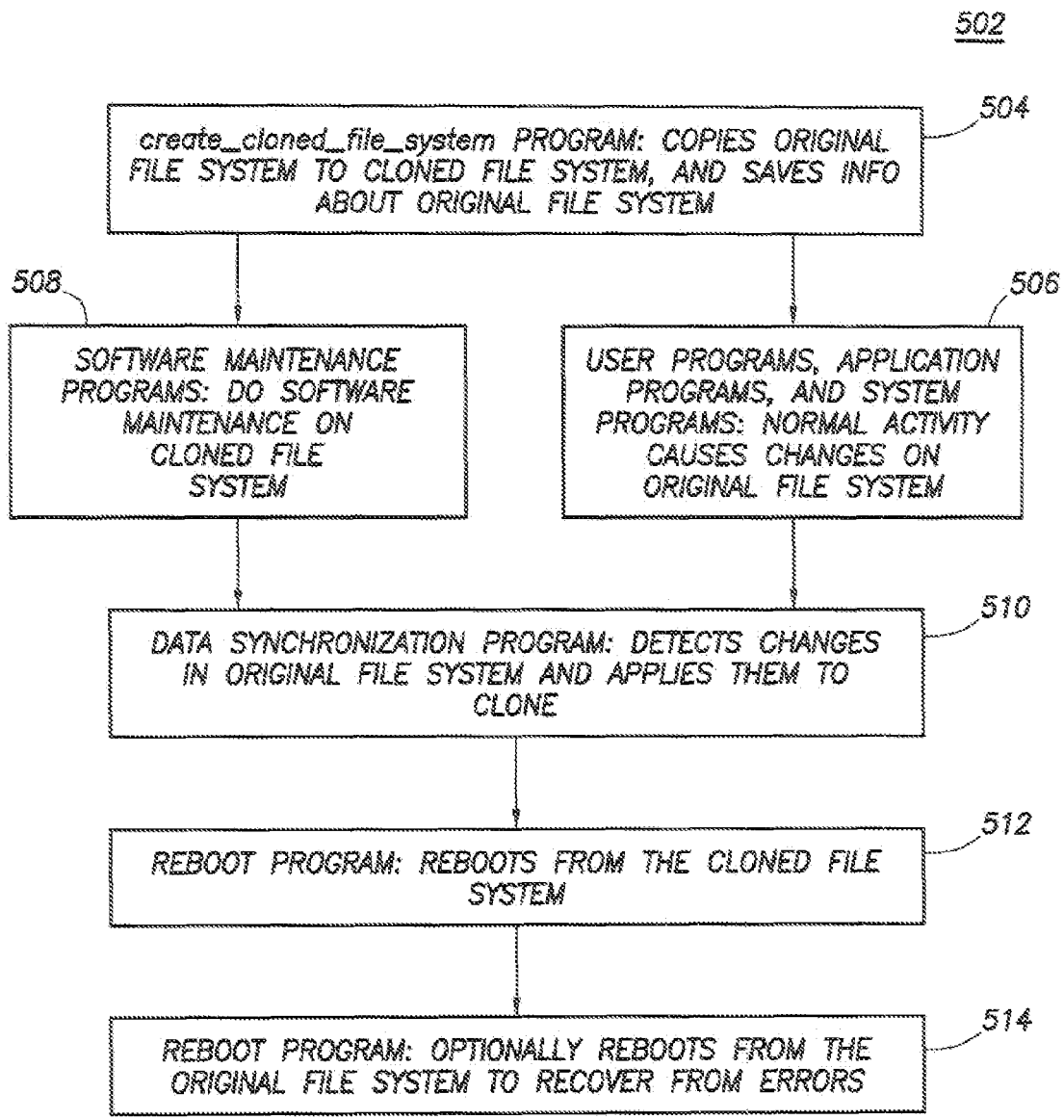
FIGS. 5 and 6 are representations of an exemplary logic and data flow for an implementation of the apparatus of FIG. 1.
Figure 6:
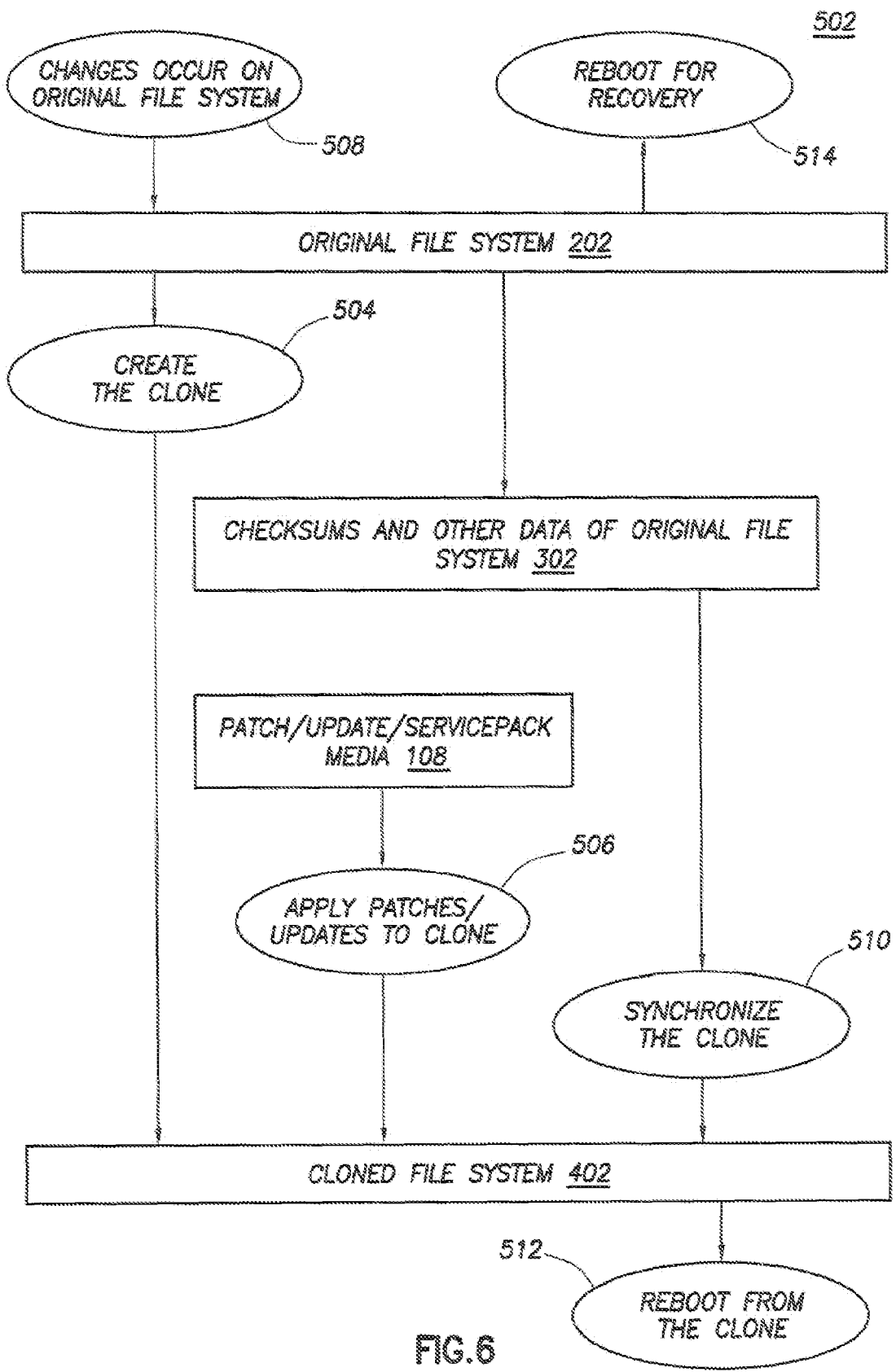

An illustrative description of an exemplary operation of an implementation of the apparatus 100 is presented, for explanatory purposes. FIGS. 5 and 6 are representations of an exemplary logic and data flow 502. At STEP 504, the clone file system 402 is created from the original file system 202. The create_clone_file_system program 204 in an example creates the copy of the original file system 202 as the clone of the original file system 202, for example, the clone file system 402. The create_clone_file_system program 204 in an example generates the metadata 302 of the original file system 202, for example, to be employed later to update the clone file system 402. The create_clone_file_system program 204 in an example saves the metadata 302 on the original file system disk drive 110, the metadata disk drive 112, and/or clone file system disk drive 114.

At STEP 506, the user programs 206, the one or more application programs 208, and/or the one or more system programs 210 in an example serve to modify, add, and/or remove files on the original file system 202, for example, as part of the normal operation and/or functioning of the computer 102 and applications that run on the computer 102. For example, STEP 506 occurs on the original file system 202 contemporaneously, concurrently, simultaneously, and/or in the same general timeframe as STEP 508. At STEP 508, the one or more software maintenance and/or data update programs 404 work on the clone file system 402. An exemplary software maintenance and/or data update program 404 serves to apply and/or install one or more patches and/or updates to the clone file system 402 and/or perform other software maintenance and/or data update on the clone file system 402.

At STEP 510, an exemplary data coordination and/or data synchronization program 212 looks for changes that have occurred on the original file system 202 since the time of creation of the clone file system 402 and the metadata 302. The data coordination and/or data synchronization program 212 in an example coordinates and/or synchronizes the clone file system 402 by looking at files on the original file system 202, files on the clone file system 402, and the metadata 302, for example, the saved checksum and other attributes and mergeable files. The data coordination and/or data synchronization program 212 in an example detects changes that happened on the original file system 302 after the clone file system 402 was created, and applies those changes to the clone file system 402.

At STEP 512, the reboot command on the original file system 202 in an example is employed to boot the computer system 102 from the clone file system 402. In an exemplary implementation, a reboot program residing in an operating system that is not currently active is not used, for example, since a reboot command from that reboot program may not be compatible with the currently active operating system. The reboot of the computer 102 from the clone file system 402 in an example comprises the only and/or substantially the only time when there is downtime for the computer 102 between the time of creation of the clone file system 402, through the software maintenance and/or data update of the clone file system 402, and through the data coordination and/or data synchronization for the clone file system 402 for changes that occurred from activity on the original file system 202 while the clone file system 402 underwent the software maintenance and/or data update.

At STEP 514, the reboot command on the original file system 202 in an example is optionally employed to boot the computer system 102 from the original file system 202, for example, optional rebooting off the original file system 202 serves to recover from errors. The reboot command on the clone file system 402 in an example is employed to boot the computer 102 from the original file system 202. In an exemplary implementation, this step is done only if it is determined that some sort of mistake happened during the overall clone task that resulted in a clone file system 402 that is not employable, and it is desirable to return the computer 102 to an employment of the original file system 202 without the software maintenance and/or data update being applied.

An exemplary approach saves metadata 302 about an original file system 202 approximately at a time of creation of a clone file system 402 of the original file system 202, and employs the metadata 302 at a later time to apply to the clone file system 402 data changes from activity on the original file system 202 between the time of creation of the clone file system 402 and approximately the later time.

An exemplary approach saves the metadata 302 as information about all and/or substantially all files on the original file system 202 approximately at the time of creation of the clone file system 402. An exemplary approach detects, through an employment of the metadata 302, all and/or substantially all files that have been one or more of changed, added, and/or deleted on the original file system 202 between the time of creation of the clone file system 402 and approximately the later time after an application of software maintenance and/or data update to the clone file system 402.

An exemplary approach detects for a data coordination and/or data synchronization of the clone file system 402, through the employment of the metadata 302, only the all and/or substantially all files that have been the one or more of changed, added, and/or deleted on the original file system 202 and only all and/or substantially all files that have been one or more of changed, added, and/or deleted on the clone file system 402 between the time of creation of the clone file system 402 and the later time after the application of software maintenance and/or data update to the clone file system 402.

An exemplary approach applies, as the data coordination and/or data synchronization of the clone file system 402, the data changes on the clone file system 402 to only the all and/or substantially all files that have been the one or more of changed, added, and/or deleted on the original file system 202 and the only all and/or substantially all files that have been the one or more of changed, added, and/or deleted on the clone file system 402.

An exemplary approach applies the data changes on the clone file system 402 to only the all and/or substantially all files that have been the one or more of changed, added, and/or deleted on the original file system 202 as a data coordination and/or data synchronization for the clone file system 402.

An exemplary approach saves the metadata 302 to comprise a checksum for each file in the original file system 202. An exemplary approach saves the metadata 302 to comprise a checksum and all and/or substantially all other attributes of each file of the original file system 202.

An exemplary approach detects for a data coordination and/or data synchronization all and/or substantially all files that have been one or more of changed, added, and/or deleted on an original file system 202 between a time of creation of a clone file system 402 of the original file system 202 and a later time after an application of software maintenance and/or data update to the clone file system 402.

An exemplary approach detects for the data coordination and/or data synchronization only the all and/or substantially all files that have been the one or more of changed, added, and/or deleted on the original file system 202 and only all and/or substantially all files that have been one or more of changed, added, and/or deleted on the clone file system 402 between the time of creation of the clone file system 402 and the later time after the application of software maintenance and/or data update to the clone file system 402.

An exemplary approach identifies for the data coordination and/or data synchronization only the all and/or substantially all files that have been the one or more of changed, added, and/or deleted on the original file system 202 between the time of creation of the clone file system 402 and the later time after the application of software maintenance and/or data update to the clone file system 402.

An exemplary approach identifies for the data coordination and/or data synchronization only the all and/or substantially all files that have been the one or more of changed, added, and/or deleted on the original file system 202 and only all and/or substantially all files that have been one or more of changed, added, and/or deleted on the clone file system 402 between the time of creation of the clone file system 402 and the later time after the application of software maintenance and/or data update to the clone file system 402.

An exemplary approach saves metadata 302 about the original file system 202 approximately at the time of creation of the clone file system 402. An exemplary approach employs the metadata 302 at the later time to detect for the data coordination and/or data synchronization the all and/or substantially all files that have been the one or more of changed, added, and/or deleted on the original file system 202.

An exemplary approach applies to the clone file system 402, as the data coordination and/or data synchronization, data changes from the all and/or substantially all files that have been the one or more of changed, added, and/or deleted on the original file system 202.

An exemplary implementation comprises a clone creation computer program 204 that saves metadata 302 about an original file system 202 approximately contemporaneously with creation of a clone file system 402 of the original file system 202, and a coordination and/or synchronization computer program 212 that employs the metadata 302 at a later time to apply to the clone file system 402 data changes from activity on the original file system 202 between the time of creation of the clone file system 402 and approximately the later time.

An exemplary implementation comprises a user-level clone creation computer application that saves the metadata 302 about the original file system 202 approximately contemporaneously with creation of the clone file system 402. An exemplary implementation comprises a user-level coordination and/or synchronization computer application that employs the metadata 302 at the later time to apply to the clone file system 402 data changes from activity on the original file system 202 between the time of creation of the clone file system 402 and approximately the later time.

An exemplary implementation comprises a single computer 102 that comprises the clone creation computer program 204, the coordination and/or synchronization computer program 212, an original file system disk drive 110, and a clone file system disk drive 114. The clone creation computer program 204 in an example saves the metadata 302 about the original file system 202 on the clone file system disk drive 114. The clone creation computer program 204 in an example creates the clone file system 402 on the clone file system disk drive 114.

The clone file system disk drive 114 in an example comprises a bootable disk separate from a bootable disk of the original file system disk drive 110. The clone creation computer program 204 in an example creates the clone file system 402 on the bootable disk of the clone file system disk drive 114.

An exemplary implementation comprises a single computer 102 that comprises the clone creation computer program 204, the coordination and/or synchronization computer program 212, and a disk drive 108, 110, 112, 114 that comprises a plurality of bootable partitions that comprises a first bootable partition and a second bootable partition. The first bootable partition in an example comprises the original file system 202. The clone creation computer program 204 in an example saves the metadata 302 about the original file system 202 on the second bootable partition. The clone creation computer program 204 in an example creates the clone file system 402 on the second bootable partition.

An exemplary implementation comprises a single computer 102 that comprises the clone creation computer program 204, the coordination and/or synchronization computer program 212, and a disk drive 108, 110, 112, 114 that comprises a plurality of bootable partitions that comprises a first bootable partition and a second bootable partition. The first bootable partition in an example comprises the original file system 202. The clone creation computer program 204 in an example saves the metadata 302 about the original file system 202 on the first bootable partition that comprises the original file system 202. The clone creation computer program 204 in an example creates the clone file system 402 on the second bootable partition.

An implementation of the apparatus 100 in an example comprises a plurality of components such as one or more of electronic components, mechanical components, hardware components, and/or computer software components. A number of such components can be combined or divided in an implementation of the apparatus 100. An exemplary component of an implementation of the apparatus 100 employs and/or comprises a set and/or series of computer instructions written in or implemented with any of a number of programming languages, as will be appreciated by those skilled in the art.

An implementation of the apparatus 100 in an example encompasses an article. The article comprises one or more computer-readable signal-bearing media. The article comprises means in the one or more media for saving metadata about an original file system approximately at a time of creation of a clone file system of the original file system. The article comprises means in the one or more media for employing the metadata at a later time to apply to the clone file system data changes from activity on the original file system between the time of creation of the clone file system and approximately the later time.

An implementation of the apparatus 100 in an example encompasses an article. The article comprises one or more computer-readable signal-bearing media. The article comprises means in the one or more media for detecting for a data coordination and/or data synchronization all and/or substantially all files that have been one or more of changed, added, and/or deleted on an original file system between a time of creation of a clone file system of the original file system and a later time after an application of software maintenance and/or data update to the clone file system.

An implementation of the apparatus 100 in an example employs one or more computer readable signal bearing media. A computer-readable signal-bearing medium in an example stores software, firmware and/or assembly language for performing one or more portions of one or more implementations. An example of a computer-readable signal bearing medium for an implementation of the apparatus 100 comprises the recordable data storage medium of the software maintenance and/or data update media location 108, the original file system disk drive 110, the metadata disk drive 112, and/or the clone file system disk drive 114. A computer-readable signal-bearing medium for an implementation of the apparatus 100 in an example comprises one or more of a magnetic, electrical, optical, biological, and/or atomic data storage medium. For example, an implementation of the computer-readable signal-bearing medium comprises one or more floppy disks, magnetic tapes, CDs, DVDs, hard disk drives, and/or electronic memory. In another example, an implementation of the computer-readable signal-bearing medium comprises a modulated carrier signal transmitted over a network comprising or coupled with an implementation of the apparatus 100, for instance, one or more of a telephone network, a local area network ("LAN"), a wide area network ("WAN"), the Internet, and/or a wireless network.

The steps or operations described herein are examples. There may be variations to these steps or operations without departing from the spirit of the invention. For example, the steps may be performed in a differing order, or steps may be added, deleted, or modified.

Although exemplary implementation of the invention has been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A computerized method, comprising:
saving metadata about an original file system;
creating a clone file system of the original file system; and then
making a first modification to the original file system;
making a second modification to the clone file system, the first modification different than the second modification; and then
identifying the first modification based on the metadata; and
merging the first modification into the clone file system such that the clone file system has, after the merging, both the first and second modification;
refraining from merging the second modification into the original file system until at least one boot of a computer system from the clone file system.

2. The computerized method of claim 1, wherein saving further comprises saving the metadata as information about files on the original file system.

3. The computerized method of claim 1, wherein identifying further comprises detecting, through the employment of the metadata, files on the original file system that have, between creating the clone file system and identifying the first modification, been at least one selected from the group consisting of: changed, added, and deleted.

4. The computerized method of claim 3, wherein detecting further comprises:
- detecting, through the employment of the metadata, files on the clone file system that have at least one selected from the group consisting of: changed, added, and deleted;
- determining corresponding detected files as between the original file system and the clone file system that have been at least one selected from the group consisting of: changed, added, and deleted.

5. The computerized method of claim 1, wherein saving further comprises saving the metadata comprising a checksum for each file in the original file system.

6. The computerized method of claim 5, wherein saving further comprises saving the metadata comprising a checksum and at least one attribute of each file of the original file system.

7. A computer-readable storage medium storing a program that, when executed by a processor causes the processor to:
- save metadata about an original file system;
- create, contemporaneously with saving the metadata, a clone file system of the original file system; and
- at a later time identify a first modification to the original file system based on the metadata; and
- merge the first modification into the clone file system such that the clone file system has, after the merging, the first modification and a second modification different than the first modification;
- prevent merging the second modification into the original file system until at least one boot of a computer system from the clone file system.

8. The computer-readable storage medium of claim 7, wherein:
- when the processor saves the metadata, the program causes the processor to save the metadata about the original file system with the program operating as a user-level program;
- when the processor identifies the first modification based on the metadata, the program further causes the processor to identify the first modification with the program operating as a user-level program.

9. The computer-readable storage medium of claim 7 wherein:
- when the processor saves the metadata, the program causes the processor to save the metadata about the original file system on a clone file system disk drive; and
- when the processor creates the clone, the program causes the processor to create the clone file system on the clone file system disk drive.

10. The computer-readable storage medium of claim 9, wherein when the processor creates the clone file system, the program causes the processor to create the clone file system on a bootable disk of the clone file system disk drive.

11. The computer-readable storage medium of claim 7 wherein when the processor saves the metadata, the program causes the processor to save the metadata about the original file system on a second bootable partition, different than a first bootable partition on which the original file system resides, and to create the clone file system on the second bootable partition.

12. The computer-readable storage medium of claim 7 wherein when the processor saves the metadata, the program causes the processor to save the metadata about the original file system on a first bootable partition that comprises the original file system and to create the clone file system on a second bootable partition.

* * * * *

UNITED STATES PATENT AND TRADEMARK OFFICE
CERTIFICATE OF CORRECTION

| | | |
|---|---|---|
| PATENT NO. | : 7,606,842 B2 | Page 1 of 1 |
| APPLICATION NO. | : 11/535713 | |
| DATED | : October 20, 2009 | |
| INVENTOR(S) | : Gary Lee Quakenbush | |

It is certified that error appears in the above-identified patent and that said Letters Patent is hereby corrected as shown below:

In column 13, line 22, in Claim 7, delete "processor" and insert -- processor, --, therefor.

Signed and Sealed this

Twenty-third Day of February, 2010

David J. Kappos
*Director of the United States Patent and Trademark Office*